United States Patent [19]
Winton, III

[11] Patent Number: 5,452,978
[45] Date of Patent: Sep. 26, 1995

[54] SELF-CLINCHING RIGHT-ANGLE FASTENER

[76] Inventor: George R. Winton, III, 242 Ashbourne Trail, Lawrenceville, Ga. 30243

[21] Appl. No.: 153,151

[22] Filed: Nov. 15, 1993

[51] Int. Cl.⁶ .................................................. F16B 37/04
[52] U.S. Cl. .................... 411/180; 411/104; 411/427; 403/407.1; 403/405.1; 403/403; 403/282
[58] Field of Search ..................... 403/403, 382, 403/252, 253, 254, 405.1, 406.1, 407.1, 295, 263, 264, 231, 282; 411/104, 180, 179, 183, 113, 112, 427, 107; 29/520, 525

[56] References Cited

U.S. PATENT DOCUMENTS

| | | | |
|---|---|---|---|
| 3,270,793 | 9/1966 | Polman | 411/180 |
| 4,130,138 | 12/1978 | Swanstrom | 138/109 |
| 4,637,766 | 1/1987 | Milliser | 411/180 |

FOREIGN PATENT DOCUMENTS

| | | | |
|---|---|---|---|
| 2454555 | 12/1980 | France | 411/183 |
| 1291151 | 10/1972 | United Kingdom | 403/403 |
| 2215425 | 9/1989 | United Kingdom | 403/252 |

*Primary Examiner*—Anthony Knight

[57] ABSTRACT

A self-clinching fastener to be embedded into a first sheet material. The self-clinching fastener is used to secure the first sheet material 40 to a second sheet material wherein the first sheet material is oriented at a right angle to the second sheet material 42.

3 Claims, 4 Drawing Sheets

SELF-CLINCHING RIGHT-ANGLE FASTENER

BACKGROUND—FIELD OF INVENTION

The present invention relates to self-clinching or clinch-type fasteners, and more particularly concerns a modified mounting arrangement that will allow two sheet materials to be joined at a right angle.

BACKGROUND—DESCRIPTION OF PRIOR ART

It is common in the metal working industry to fasten two substantially parallel surfaces with self-clinching fasteners. Such fasteners are disclosed by U.S. Pat. No. 4,637,766 which was issued to John Milliser on Jan. 20, 1987 and U.S. Pat. No. 4,130,138 which was issued to Kenneth A. Swanstrom on Dec. 19, 1978. These fasteners are adequate for joining two substantially parallel surfaces together. Their limitation is quickly realized when two sheet materials, oriented substantially perpendicular to one another, require fastening. In order to join two perpendicular sheet materials, a right-angle bracket is typically employed. The bracket typically takes one of two forms. The first form involves stamping a flat pattern from an appropriate sheet. The flat pattern is then formed into its final shape by means of a break press. If the sheet stock is too thin for tapping, commonly found self-clinching studs and/or self-clinching nuts are typically installed. The alternative form replaces the stamped flat pattern with a piece of angle stock. The angle stock, usually sufficiently thick enough for tapping, can be drilled and tapped as required. In both cases the final bracket is usually a custom made part.

By employing either of the above brackets, excessive costs are incurred when several labor intensive operations must be performed in order to manufacture the custom bracket. This cost adds to the overall product cost required to join two substantially perpendicular sheet materials.

SUMMARY OF THE INVENTION

Accordingly, several objects and advantages of my invention are:

(a) to fasten two perpendicular surfaces to one another by means of a single self-clinching device;

(b) to replace a bracket and assorted self-clinching fasteners with a low-cost self-clinching device;

(c) to ensure perpendicular orientation of two sheet materials with a self-clinching device.

Further objects and advantages are to reduce assembly costs of two perpendicular sheet materials by introducing fewer parts into an assembly. Still further objects and advantages will become apparent from a consideration of the ensuing description and drawings.

DESCRIPTION OF THE PREFERRED EMBODIMENT

Figure 1:
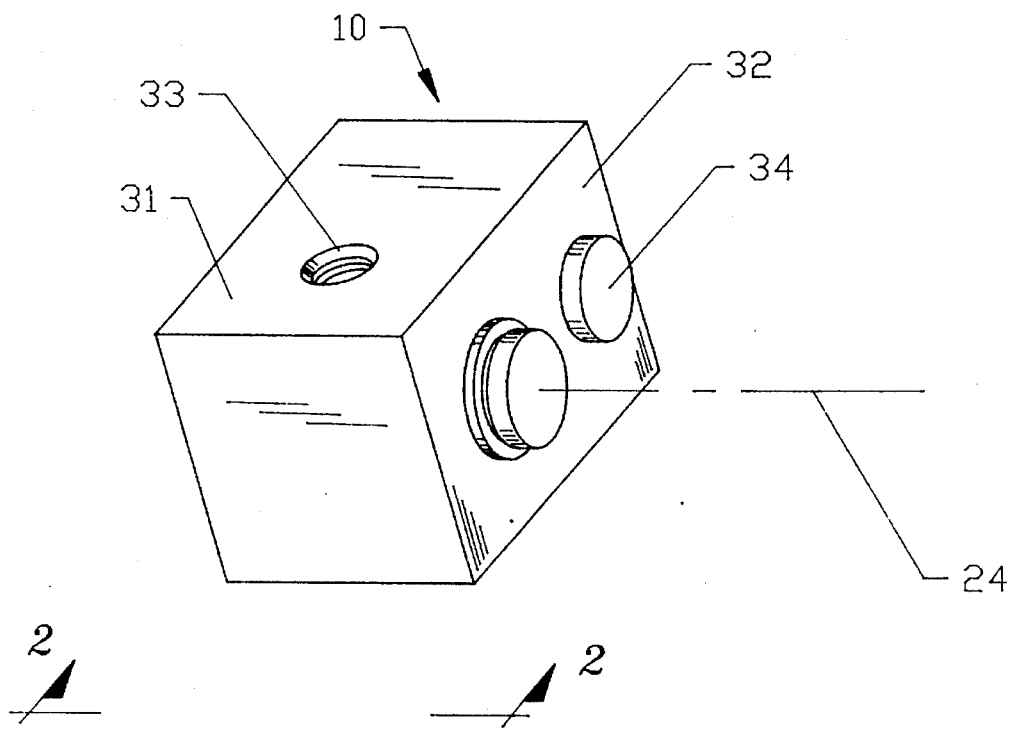
FIG. 1 shows an isometric view of a first embodiment.
Figure 2:
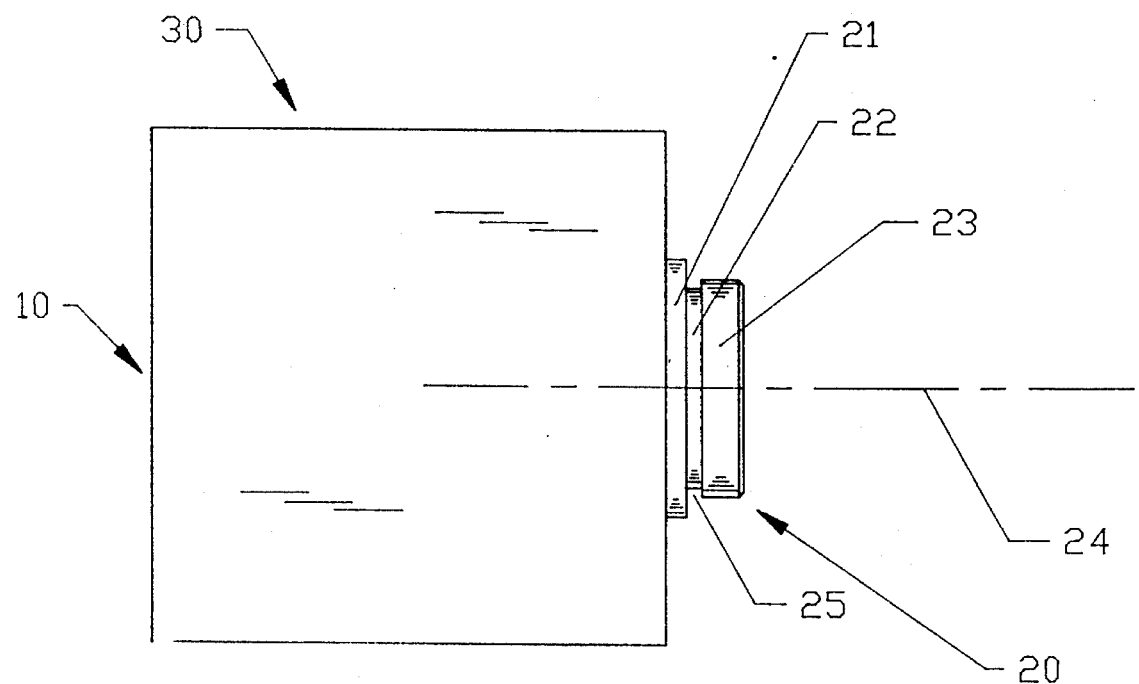
FIG. 2 shows a two dimensional detail as seen along the line 2—2 of FIG. 1.

With initial reference to FIGS. 1 and 2, the inventive fastener 10 is shown. Fastener 10 comprises a post 20 and a body 30. Post 20 comprises a first cylinder 21. A second cylinder 22 is located directly next to first cylinder 21 and a third cylinder 23 is positioned directly next to second cylinder 22. Third cylinder 23 is smaller in diameter than first cylinder 21 and larger in diameter than second cylinders 22. cylinders 21, 22, and 23 are all substantially concentric to one another. An undercut groove 25 is then established between cylinders 21 and 23. A concentric axis 24 coincides with the centers of all three cylinders 21, 22, and 23.

With further reference to FIGS. 1 and 2, also located next to the first cylinder 21 and opposite that of second cylinder 22 is body 30. Body 30 is substantially rectangular in shape with a first surface 31 oriented substantially parallel to concentric axis 24. Located substantially perpendicular to first surface 31 is a second surface 32. Second surface 32 is substantially perpendicular to concentric axis 24.

With further reference to FIG. 1, an internal thread 33 originates on first surface 31 and is substantially perpendicular to first surface 31. The internal thread 33 is substantially perpendicular to concentric axis 24, a boss 34 is formed on surface 32 and extends slightly beyond the height of first cylinder With reference to FIGS. 3 and 4, third cylinder 23 is mated with a slightly larger first hole 41 in first sheet material 40. By rotating the fastener 10 about concentric axis 24, boss 34 will align with a mating second hole 44 in first sheet material 40. When boss 34 is substantially aligned with second hole 44, surface 31 and hence hole 33 are then properly aligned with first sheet material 40. When first cylinder 21 is forced into first hole 41, first cylinder 21 displaces a portion of first sheet material 40 in the area designated by 46 into undercut groove 25, whereby fastener 10 becomes mechanically bonded to first sheet material 40, as is shown and illustrated in FIG. 3. A similar mechanical bonding arrangement is suggested in U.S. Pat. No. 4,130,138.

Figure 3:
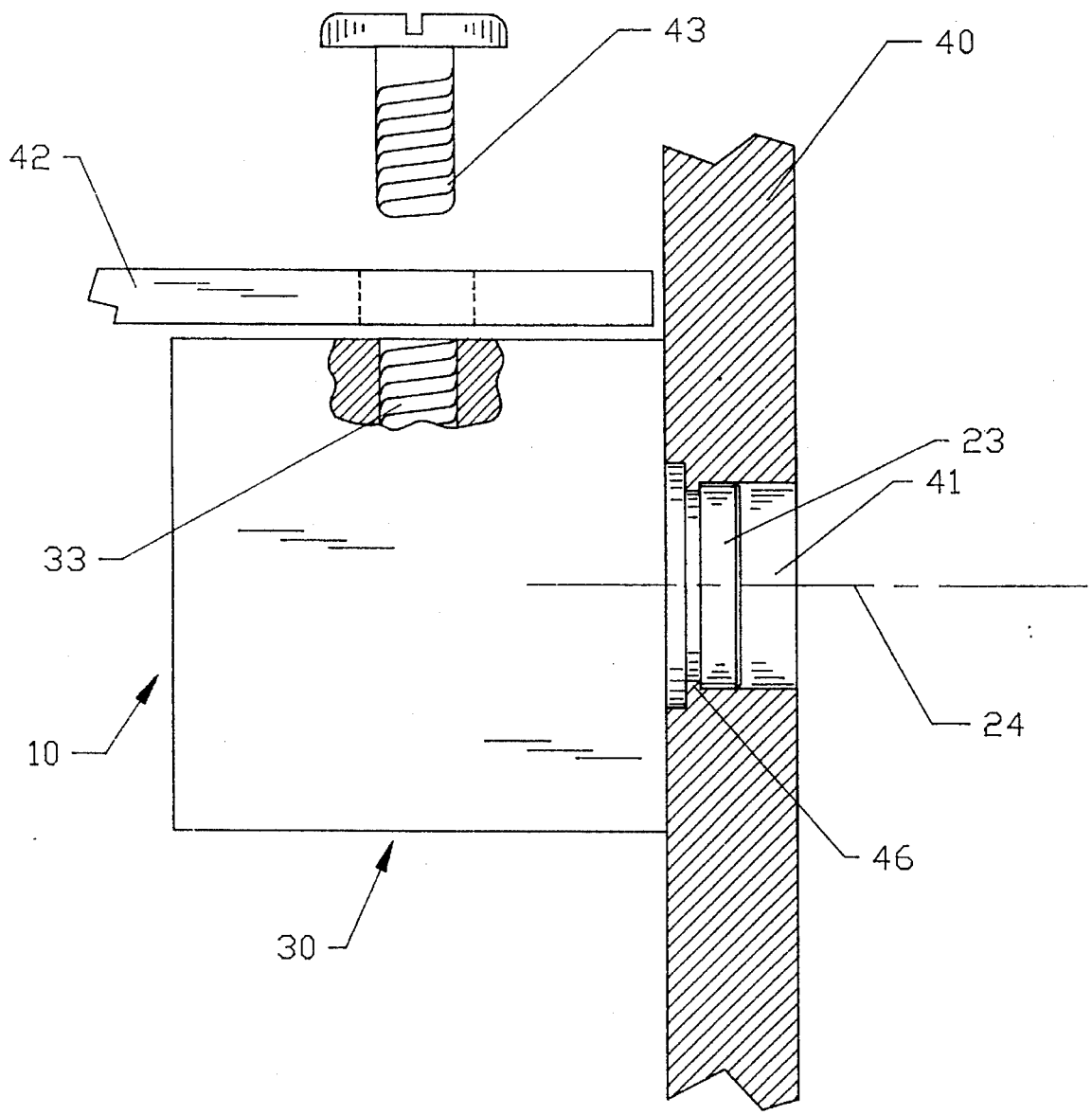
FIG. 3 shows a two dimensional front view of the first embodiment of Figure and its self-clinching means, the first sheet material, and the second sheet material.
Figure 4:
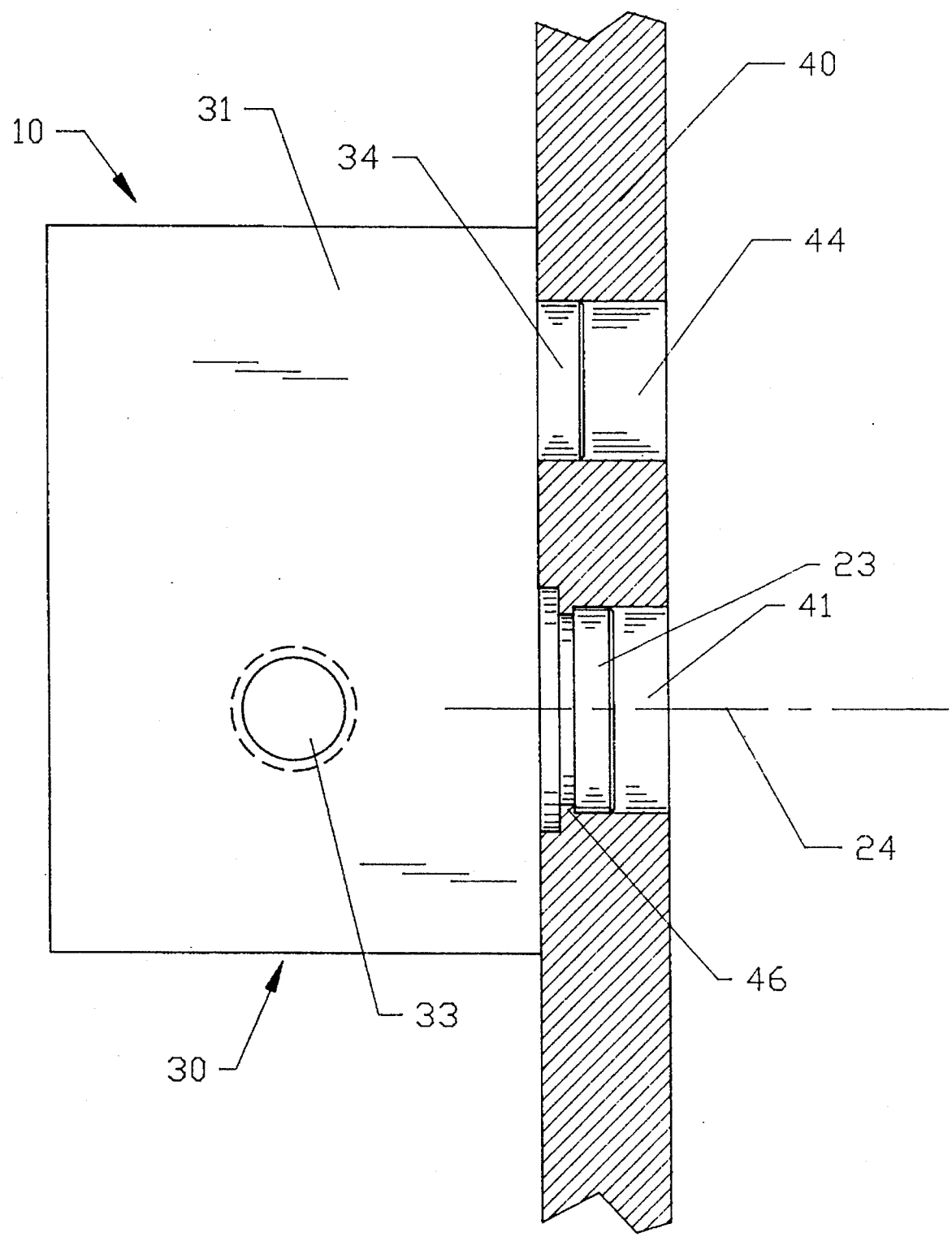
FIG. 4 shows a two dimensional top view of the alignment means, the self-clinching means, and its interaction with the first sheet material.

With further reference to FIGS. 3 and 4, with fastener 10 properly aligned with first sheet material 40, surface 31 is properly positioned to accept second sheet material 42. By ensuring the proper orientation of fastener 10, mounting surface is correctly positioned in a substantially perpendicular plane with respect to first sheet material 40. A threaded fastener 43 can then mate with internal thread 33 to complete the fastening of first sheet material 40 to second sheet material 42. In addition to properly aligning fastener 10, boss 34 prevents preferred fastener 10 from rotating about concentric axis 24.

Thus the reader will see that by fastening two sheet materials together with fastener 10, this will significantly reduce the number of components required to join two surfaces together in a perpendicular fashion. Also, by using the above described fastener 10 assembly cycle time will be reduced.

Figure 5:
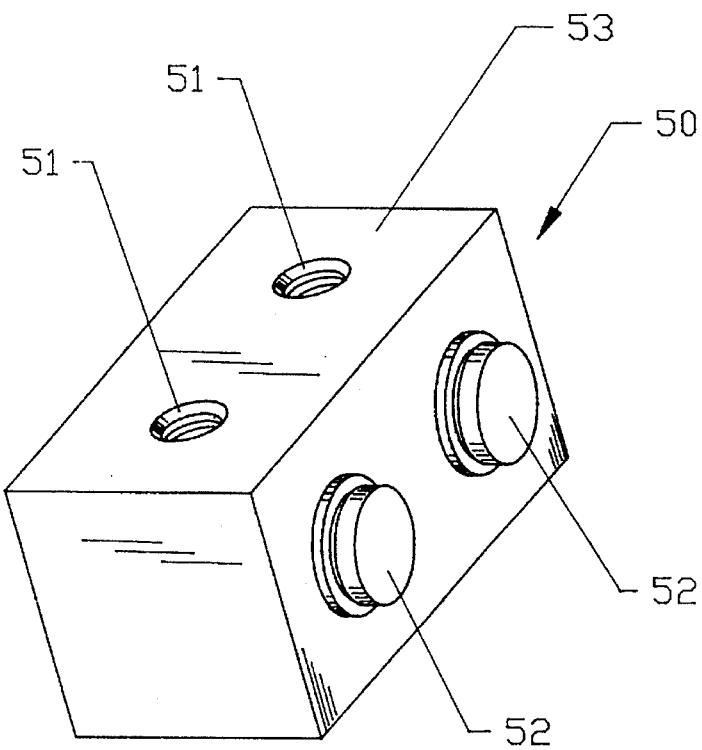
FIG. 5 shows an isometric view of a second embodiment.
Figure 6:
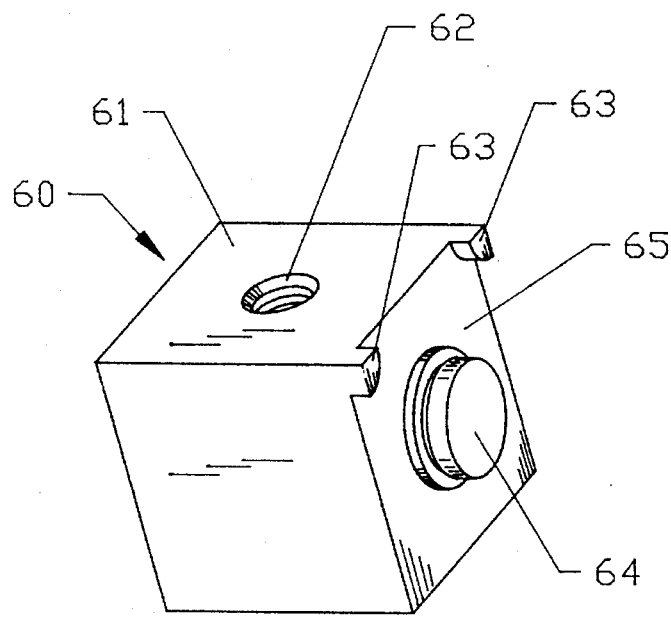
FIG. 6 shows an isometric view of the third embodiment.

While the above description contains many specificities, these should not be construed as limitations on the scope of the invention, but rather as an exemplification of a first embodiment thereof. Many other variations are possible. For example, FIG. 5 shows a second embodiment wherein a fastener 50 incorporates two self-clinching posts 52 and two internal threads 51. fastener 50 shown in FIG. 5 uses both self-clinching posts, 52 to ensure proper alignment and to prevent rotation. By ensuring the alignment with two self-clinching posts 52, a top mounting surface 53 is assured to be properly positioned. A third embodiment, 60 is shown in FIG. 6. fastener 60 uses a self-clinching post 64 and two alignment bosses 63. In addition to aligning a surface 61 and hence a internal thread 62, bosses 63 also prevents fastener 60 from rotating in a plane substantially parallel to a surface 65. With reference to FIG. 2, further embodiments could replace cylinders 21 22, and 23 with one of many known self-clinching means. Also, with reference to FIG. 6, internal thread 62 could be replaced with an external thread where said external thread would be located on surface 61 and would extend outwardly from surface 61. The direct replacement of an internal thread (female) for an external thread (male) is an alternative for all embodiments disclosed.

Accordingly, the scope of the invention should be determined not by the embodiment illustrated, but by the appended claims and their legal equivalents.

I claim:

1. A self-clinching fastener for fastening a first sheet material to a second sheet material, said self-clinching fastener comprising:

a first surface and a second surface, said second surface is perpendicular to said first surface;

a post means, extending from said first surface, for penetrating the first sheet material; wherein said post means comprises;

a first cylinder formed on said first surface;

a second cylinder, concentric with and formed on said first cylinder and having a diameter smaller than that of said first cylinder;

a third cylinder, concentric with said first and second cylinders, said third cylinder being formed on said second cylinder and having a diameter smaller than that of said first cylinder and larger than that of said second cylinder; and wherein said first, second, and third cylinders form an undercut groove which receives an amount of the first sheet material displaced by said first cylinder upon penetration of said first cylinder into the first sheet material;

a boss means, extending from said first surface, for penetrating the first sheet material to prevent rotation of said self-clinching fastener about an axis coinciding with said post means when said post means is embedded in the first sheet material; and an attachment means, having a thread and located at said second surface, for fastening with the second sheet material.

2. The self-clinching fastener as claimed in claim 1, wherein said attachment means comprises a threaded hole formed in said second surface and the thread is an internal thread formed in said hole, said threaded hole is to receive a threaded fastener passing through the second sheet material.

3. The self-clinching fastener as claimed in claim 1, wherein; said boss means comprises:

a fourth cylinder formed on the first surface;

a fifth cylinder, concentric with and formed on said fourth cylinder and having a diameter smaller than that of said fourth cylinder;

a sixth cylinder, concentric with said fourth and fifth cylinders, said sixth cylinder being formed on said fifth cylinder and having a diameter smaller than that of said fourth cylinder and larger than that of said fifth cylinder; and wherein said fourth, fifth and sixth cylinders form a second undercut groove which receives a second amount of said first sheet material displaced by said fourth cylinder upon penetration of said fourth cylinder into said first sheet material.

* * * * *